United States Patent [19]
Pichel et al.

[11] Patent Number: 5,306,382
[45] Date of Patent: Apr. 26, 1994

[54] LABEL DISPENSER CONVERSION KIT

[75] Inventors: Maurice D. Pichel, Milford; Syed A. Asghar, Brockton, both of Mass.

[73] Assignee: Avery-Dennison Corporation, Pasadena, Calif.

[21] Appl. No.: 609,508

[22] Filed: Nov. 6, 1990

[51] Int. Cl.⁵ .............................................. B32B 31/00
[52] U.S. Cl. ..................................... 156/361; 156/542
[58] Field of Search ............... 156/540, 541, 542, 360, 156/64, 361

[56] References Cited

U.S. PATENT DOCUMENTS 4,732,641  3/1988  Nechay et al. ........................ 156/542

Primary Examiner—David A. Simmons
Assistant Examiner—William J. Matney, Jr.
Attorney, Agent, or Firm—Arthur B. Moore

[57] ABSTRACT

Apparatus for converting a heat transfer labeller of the type which transports labels on a carrier web to a heat transfer site, to use as a film pressure sensitive labeller. Devices at and around the label transfer site are removed and replaced with a peel plate and label applicator for pressure transfer of labels. Idler rolls are added to the machine to guide the label carrier web from an unwind reel to the pressure transfer site, and from the transfer site to a take-up reel. A take-up drive is provided to pull and collect the web, providing adequate tension for dispensing film pressure sensitive labels. The take-up drive may comprise a controlled speed take-up motor at the take-up reel, or may comprise a label registration drive which supplements the pulling force provided by the take-up reel. Optionally, a substitute take-up reel with high torque drive may entirely replace the take-up mechanism of the heat transfer labelling machine.

6 Claims, 11 Drawing Sheets

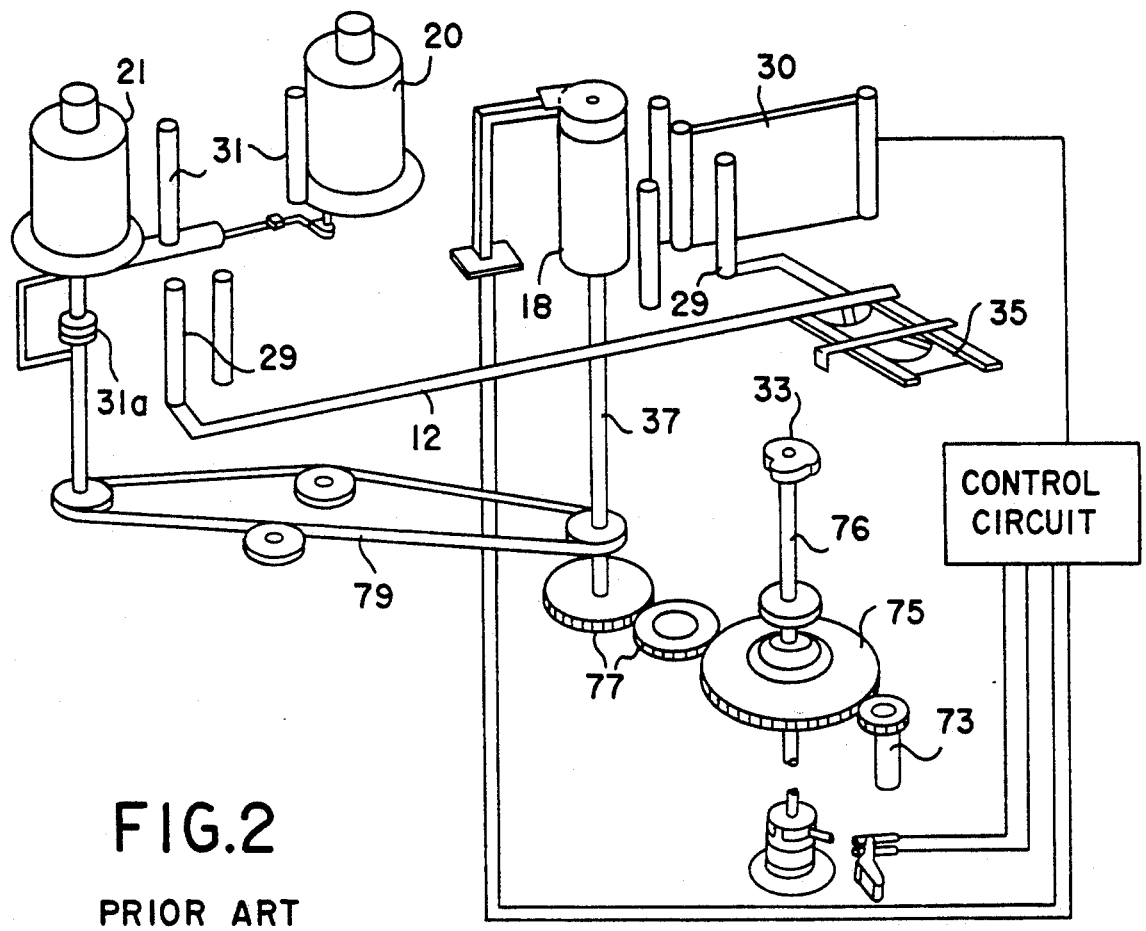
FIG.2
PRIOR ART
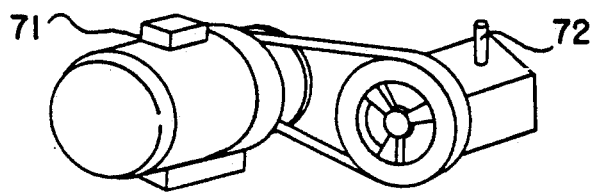

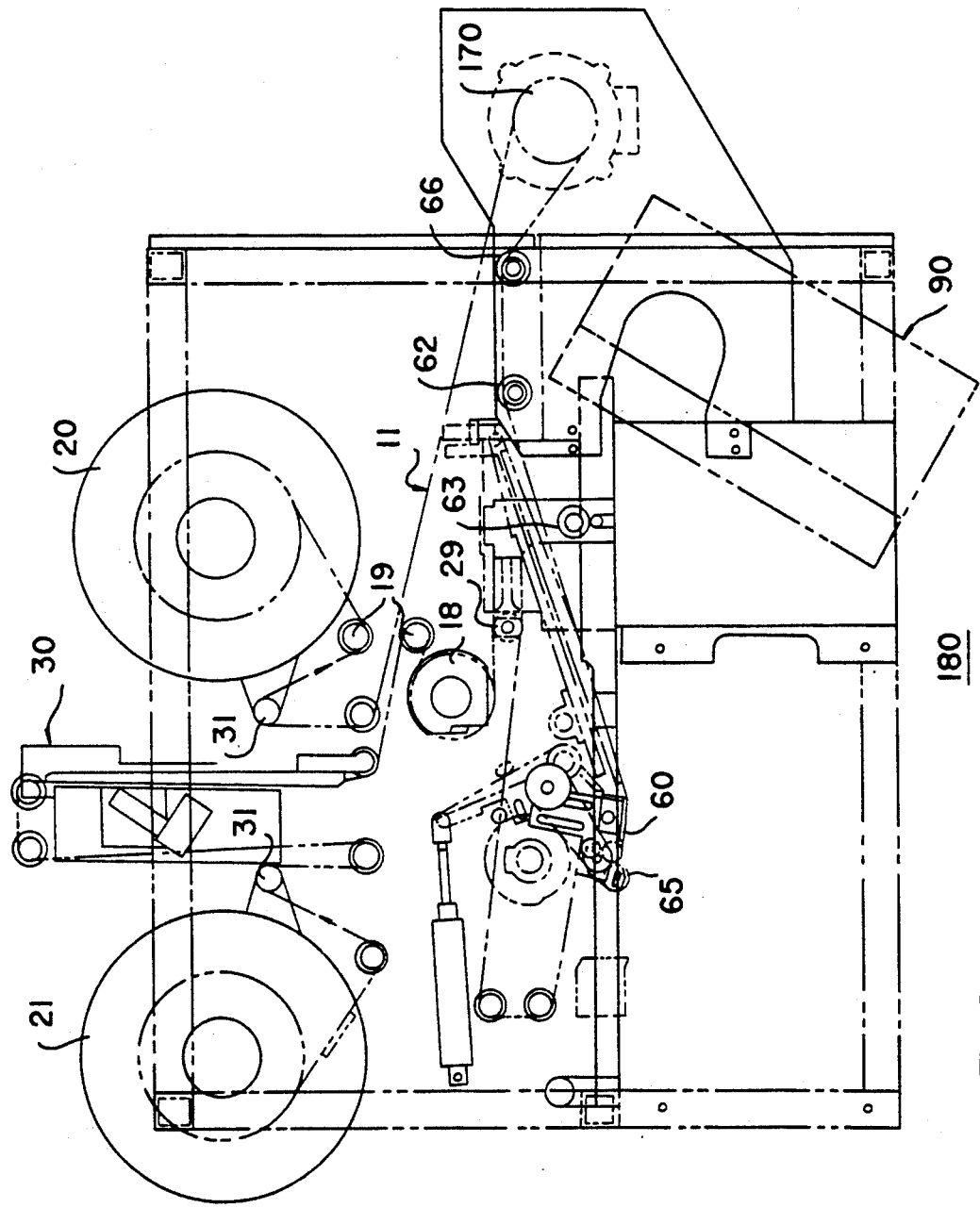

LABEL DISPENSER CONVERSION KIT

The present invention relates to film pressure sensitive labelling apparatus, and more particularly to conversion of heat transfer labelling machines for use as film pressure sensitive label dispensers.

Over the years, the assignee of the present invention has sold a wide variety of heat transfer labelling machines under the "THERIMAGE" trademark. A recent design of such machines is shown in the prior art views of FIGS. 1 and 2.

As shown in the plan view of FIG. 1, which illustrates a prior art heat transfer labelling machine, in accordance with commonly assigned U.S. Pat. No. 4,383,880, a decorator 10 includes a label bearing carrier web 11 routed from an unwind reel 20, through various transport control and label processing stations, to a take-up reel 21. The principal transport elements of the carrier web are a metering roll 18, a label scanner 30, a shuttle 12 with attached shuttle rolls 28, 29 and tension control devices 31 associated with the unwind and take-up reels. A label preheater 23 and a transfer or platen roll 22 together preheat labels on the web 11 and transfer them to articles using heat and pressure. Platen roll 22 is mounted on support bracket 26. A bottle or other article 14 is carried by turret 13 into proximity with the carrier web 11, where transfer roll 22 impresses the heated label against the bottle for label transfer. A cam 19 is used to move the transfer roll 22 in such a manner that the roll follows the surface contour of the bottle 14 as it is being rotated about its own axis during label transfer.

Control over web transport is by shuttle rolls 28, 29 mounted on shuttle 12, which is reciprocated by the label shuttle slide 35, the drive of which is discussed below. Various idler rolls 19 guide web 11 from unwind roll 20 and to take-up roll 21.

The metering roll 18, in conjunction with label shuttle 12, provides intermittent web motion at the decoration site. Thus, the web is normally advanced at a predetermined speed during decoration, but stops or retracts during interim periods. This allows closer spacing of labels on the carrier web 11. The intermittent web motion is regulated by a signal from the scanner assembly 30. This control signal actuates and deactuates clutch and brake assemblies within the metering roll 18 as moderated by a master timing mechanism.

With reference to FIG. 2, the timing mechanism is controlled by a driven heart shaped cam 33 to coordinate web transport with other machine functions. The shuttle 12, along with mounted shuttle rolls 28, 29 are reciprocated by the label shuttle slide 35 in response to the rotation of the heart cam 33. A similar mechanism controls the motion of turret 13.

FIG. 2 also provides a schematic view of various drive components of the decorator 10 used in transporting the carrier web 11 (omitted in FIG. 2 for clarity), as well as associated control apparatus. Drive shaft 72 is driven from motor 71 to provide the basic mechanical input for the decorator 10. These mechanisms induce the rotation of the metering roll shaft 18 via gear 73, heart cam gear 75, and gears 77. Take-up or rewind reel 21 is driven from the metering roll shaft 37 by chain 79. The take-up reel 21 includes a tension control assembly 31 to control its rotation via clutch 31a; a similar tension control assembly located at the unwind reel regulates a brake (not shown).

Heart cam 33 at the top of the heart cam shaft 76 regulates the reciprocation of shuttle 12 as discussed above. The heart cam shaft controls the intermittent rotation of metering roll 18 primarily via a timing device assembly located on the heart cam shaft 76. The heart cam rotation provides a basic timing input to the other moving parts of decorator 10 via mechanisms not shown.

The above-discussed system provides sophisticated control over the motion of web-mounted labels to be transferred via heat and pressure to products such as plastic containers. This allows precise regulation of label and product motion during the labelling process, in order to ensure excellent quality of label transfer over a variety of label and product configurations.

It should be noted that the system discussed above represents one of a number of THERIMAGE web transport control schemes; for example, pin-fed web transports represent an earlier approach to that discussed above. Further reference may be had to commonly assigned U.S. Pat. No. 3,193,211 to Flood, which discloses the web tension feed equalizer; U.S. Pat. No. 3,231,448 to Flood (use of preheater in advance of labels, intermittently advanced label strip); U.S. Pat. No. 3,483,063 to Baines et al (cam driven heated platen); and U.S. Pat. No. 4,383,880 (electrooptical detection of labels); all of which are incorporated by reference herein.

Another type of labelling approach uses film pressure sensitive labels which are peeled off a carrier web and impressed onto the product to be labelled. The label-bearing web is pulled under tension around a peel plate (also sometimes referred to as a stripper plate, a beak, a tongue, or dispensing blade). As the web is bent around the plate at a sharp angle, the front edge of the label peels away from the backing. The label is then fixed to the product as the backing paper runs around the plate and is rewound on a take-up spool. A variety of application devices have been used to impress the detached labels onto the product.

The present invention enables the design of film pressure sensitive labelling machines having the same advantages of precise control over web and product motion during the labelling process. Prior art film pressure sensitive labelling machines typically have been less sophisticated in their web and product transport design. Such control ensures that labels are applied accurately and consistently to products, thereby improving label registration and avoiding wrinkling and other label deformation. As compared with the heat transfer labelling machines discussed above, however, film pressure sensitive labelling from a carrier web involves considerably higher web tensions. A labelling machine for the latter application should therefore be capable of providing acceptable label registration and durable operation while accommodating these higher web tensions.

Accordingly, it is a principal object of the invention to provide film pressure sensitive label dispensing apparatus with precise control over the motion of the label carrier web and the article to be labelled, thereby to provide superior labelling quality. A related object is to provide inexpensive, easily set up film pressure sensitive labelling apparatus for those who already possess heat transfer labelling apparatus. Another related object is to allow such parties to utilize the turrets designed for heat transfer labelling, in film pressure labelling applications. A further object of the invention is to ensure accurate label registrations and durable operation while accommodating high web tensions.

SUMMARY OF THE INVENTION

The above and additional objects are accomplished using the apparatus of the invention, which is designed for the adaptation or conversion of a heat transfer labelling machine to one used in dispensing pressure sensitive labels arrayed on a carrier web. The apparatus of the invention is designed for conversion of heat transfer labelling machines of the type including a device for moving an article to be labeled through a label transfer site, a heated applicator member for impressing a label from a carrier web onto the article, and a transport assembly for routing the carrier web bearing a plurality of labels from an unwind reel to the transfer site, and for transporting the empty carrier web from the transfer site to a take-up reel. The labelling machine conversion apparatus of the invention comprises a peel plate; a pressure applicator member, said pressure applicator member and peel plate being designed for mechanical compatibility with said heat transfer labelling machine for use in place of the heated applicator member, and a take-up assembly for pulling the web through its transport path (including the label transfer site) under high tension during web take-up.

In the preferred embodiment of the invention, the web take-up assembly incorporates the take-up reel of the heat transfer labelling machine. In a first embodiment, the prior art mechanical clutch for the take-up reel is replaced with a controlled speed take-up motor. The motor speed is controlled so that the motor's angular velocity and torque are dependent upon the diameter of the web roll on the take-up reel, in order to provide an essentially constant linear velocity of the web at this reel, and motor torque which increases with roll diameter. The speed control may be achieved electronically or mechanically, using any of a variety of well known devices. By this expedient, excessive wear of the take-up reel's slip clutch is avoided, and more accurate label registration achieved. In a variation of this first embodiment, the prior art slip clutch at the take-up reel is replaced by a magnetic particle clutch, which is controlled to provide an angular velocity depending inversely on web roll diameter.

In a second embodiment using the take-up reel for web collection, the take-up reel and its prior art slip clutch are used in combination with a label registration drive placed intermediate the take-up reel and label application site. The label registration drive exerts a torque to pull the web, in combination with the torque provided by the take-up reel, thereby to provide improved label registration and more durable operation in a high-web-tension system. The label registration drive may comprise a pair of driven nip rolls or a single roll with an adequate wrap angle. Suitable drives for this roll or pair of rolls include, for example, a magnetic particle clutch, an electric torque motor, or an air motor.

In an alternative embodiment of the invention, the take-up reel of the heat transfer decorator is not employed in the film pressure sensitive labelling machine. In lieu of the take-up reel, a substitute take-up reel is employed, using a high torque motor which is adequate for a high-web-tension film pressure sensitive labelling system.

Another aspect of the invention relates to the use of the roll and label shuttle assembly to control web motion and label registration. The web speed established by the metering roll may be slightly greater than the desired speed at the label dispensing site, and the label shuttle assembly may retard web motion. This has been observed to tension the labels during dispensing, thereby improving labelling characteristics.

Another aspect of the invention relates to the web path during set-up of the film pressure sensitive labelling machine. In the preferred embodiment, the machine incorporates means for disengaging the web from the edge of the peel plate on command. This permits the operator to run the web through its transport path during machine set-up, without causing a series of labels to be peeled from the web by the peel plate.

Preferably, the conversion apparatus further comprises a plurality of idler rolls for routing the carrier web through an alternative path from the unwind reel to the peel plate and from the peel plate to the take-up reel. In the preferred embodiment, the conversion kit further comprises a nip roll for controlling the release of labels from the carrier web at said peel plate. This nip roll improves the accuracy with which labels are dispensed at the peel plate.

BRIEF DESCRIPTION OF THE DRAWINGS

The above and additional aspects of the invention are illustrated in the following detached description of the preferred embodiment, which should be taken together with the drawings in which:

FIG. 2 is a schematic view of the label and turret drive mechanisms of the prior art heat transfer decorator of FIG. 1;

FIG. 11 is a plan view corresponding to the view of FIG. 3 of a film pressure sensitive labelling machine in accordance with a fourth embodiment of the invention.

DETAILED DESCRIPTION

Figure 3:
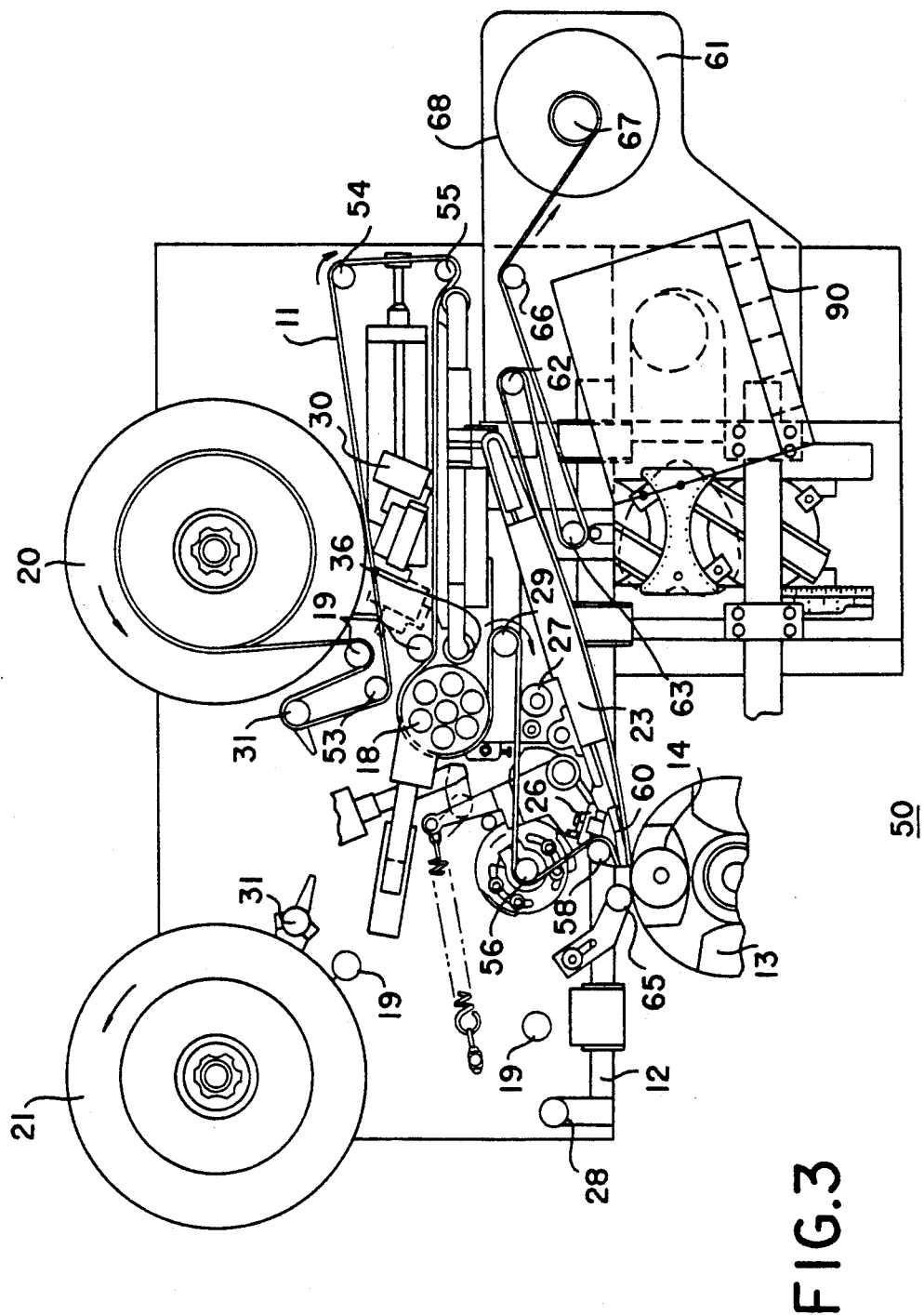
FIG. 3 is a plan view of the carrier web transport, label application area, and selected drive mechanisms of a film pressure sensitive label dispenser in accordance with a first embodiment of the invention, based upon an adaption of the heat transfer decorator of FIG. 1.
Figure 4:
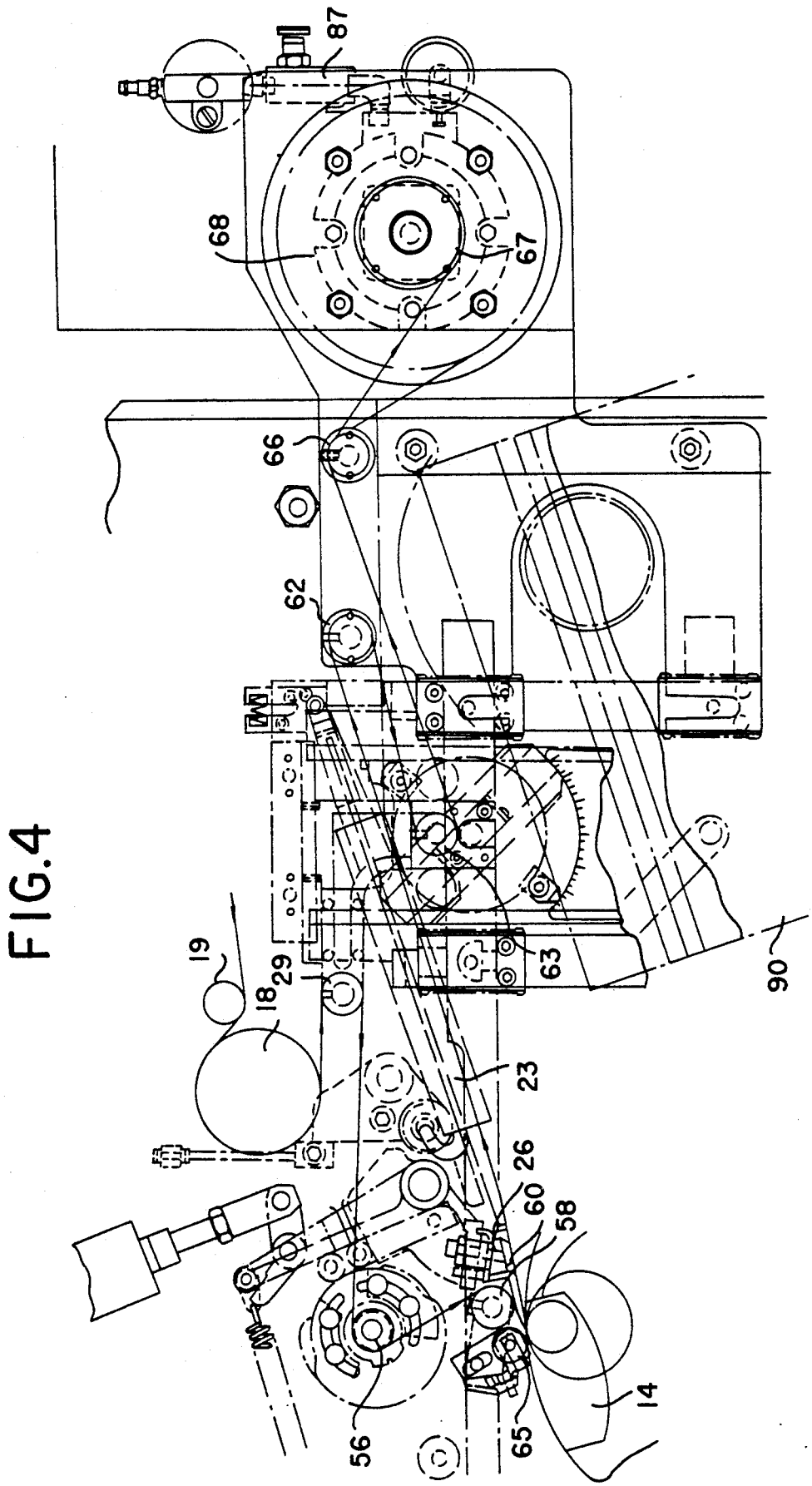
FIG. 4 is a plan view on an expanded scale of the label application area and web take-up mechanisms of the label dispenser of FIG. 3.
Figure 5:
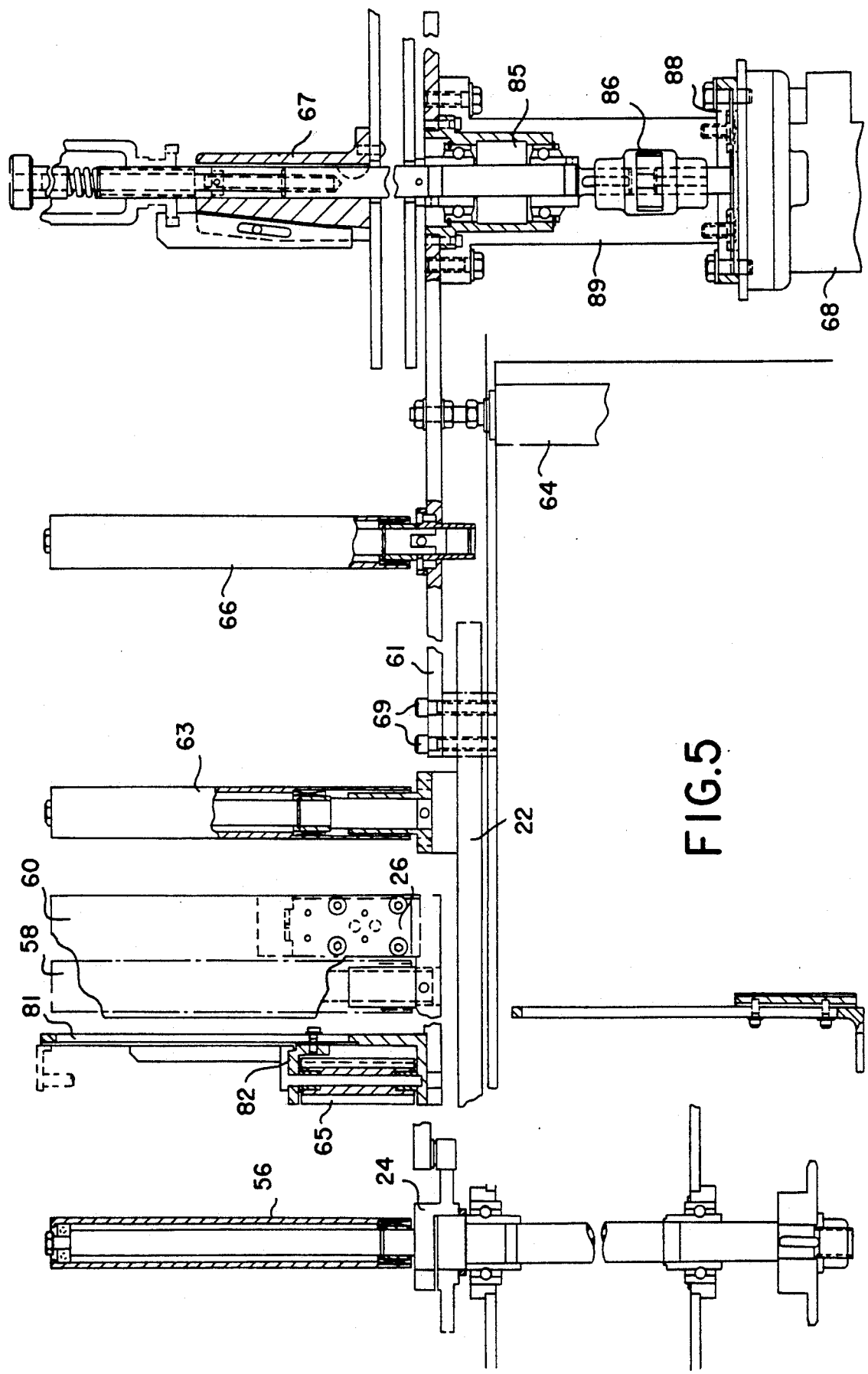
FIG. 5 is a partially sectioned elevation view of key components of the decorator conversion kit of the invention, corresponding to the embodiment of FIG. 3.

Reference should now be had to FIGS. 3-5 which shows a film pressure sensitive labelling machine 50 in accordance with a first embodiment of the invention. Referring in particular to FIG. 3, pressure sensitive label dispenser 50 is based upon the heat transfer labelling machine 10 of FIG. 1, which has been modified for use with film pressure sensitive labels as explained below. This modification consists of securing to the superstructure of heat transfer decorator 10 the following items, which comprise a retrofit kit for the conversion: idler rolls 53, 54, 55, 56, 62 and 66; nip roll 58; peel blade assembly 60; mounting plate 61; applicator roll 65; shuttle roll 63; take-up reel 67 and web rewind/tensioning motor 68. To make room for the label applicator elements, the user removes the platen assembly 22 and web guide bar 25 (the latter supports the carrier web downstream of the transfer station in decorator 10). Idler roll 56 may be mounted at the center of platen cam 24, while peel blade assembly 60 and nip roll 58 are designed to be secured to the mounting bracket 26 for the platen roll 22. Applicator roll 65 is designed to be mounted in place of web guide bar 25. Mounting plate 61 includes four screws 69 by which the plate is secured to a slide bearing (not shown) of label shuttle slide 35. Plate 61 also has two jack screws 64 for support (see FIG. 5). Plate 61 mounts the idler rolls 62, 66, take-up reel 67, and web rewind/tensioning motor 68. Shuttle roll 63 is mounted directly to label shuttle 12 as shown. Plate 61 is located over control cabinet 90 which houses the control electronics.

Figure 1:
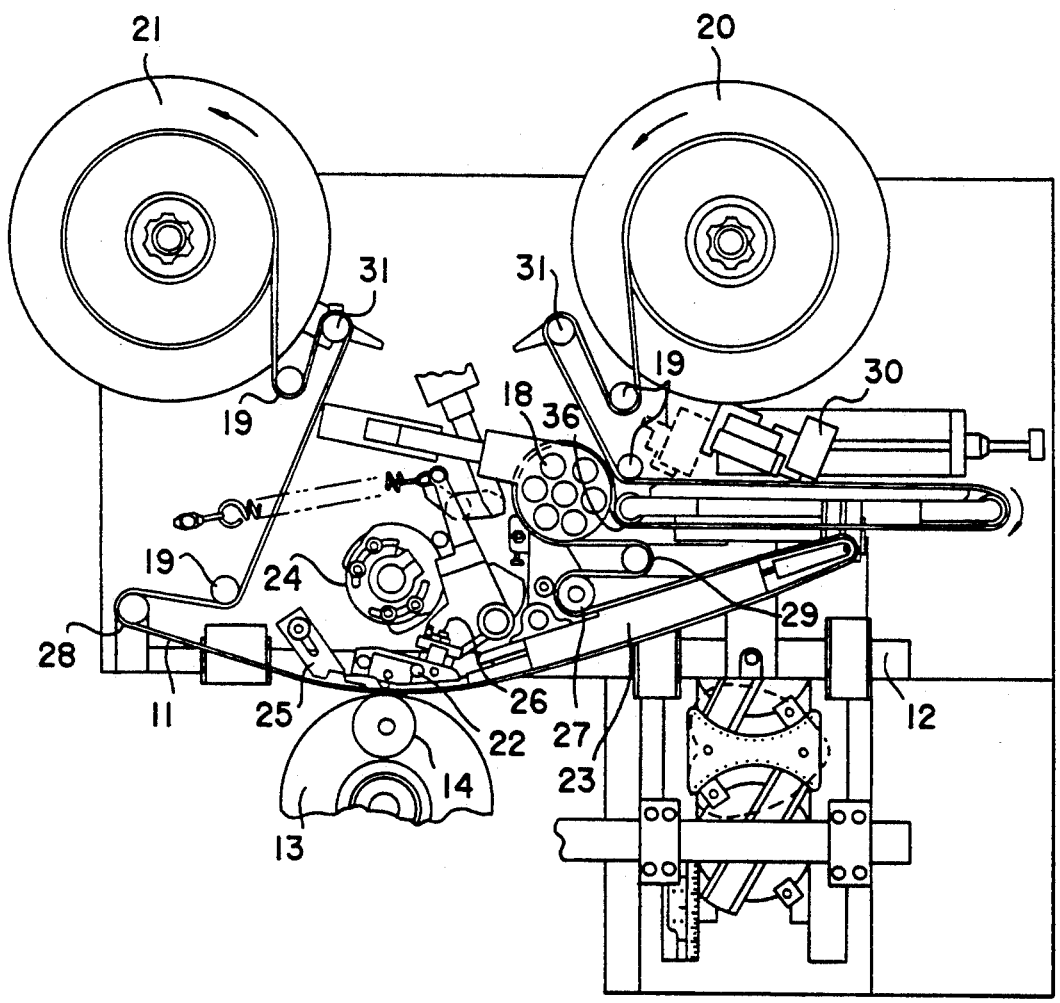
FIG. 1 is a plan view of the carrier web transport label application area, and selected drive mechanisms of heat transfer labelling machine in accordance with the prior art.

Comparing FIGS. 1 and 3, it will be seen that the carrier web threading path is somewhat similar upstream of the label application site, but completely different downstream of label transfer. In the carrier web roll on the unwind reel spindle 20 of heat transfer decorator 10, labels are located on the interior face of the web, whereas in apparatus 50 labels are located on the exterior of the web. (This is necessitated by the difference between the respective carrier web paths from the metering roll 18 to the transfer station). Idler rolls 53, 54 and 55 form a loop of the web 11 in label dispenser 50 so that the carrier web 11 will present its label-bearing face to the photoelectric label scanner 30. Because in decorator 50 web 11 passes by scanner 30 in the opposite direction from that in decorator 10, the web passes around one of the idler rolls 19 rather than idler roll 36 to reach the metering roll 18.

Referring to FIGS. 3 and 4, after passing around the shuttle roll 29, the web bypasses the label preheater 23 (and idler roll 27), proceeding directly to web handling elements associated with the pressure sensitive label dispensing station. These elements include the idler roll 56, nip roll 58, and peel blade assembly 60. Thereafter the empty carrier web is routed past preheater 23 (which is unheated), around idler roll 62, shuttle roll 63, and idler roll 66 to the take-up reel 67.

It will be seen, then, that in labeller 50 the path followed by the empty carrier web 11 is completely different from that of the heat transfer decorator 10. This is due to the fact that in decorator 50, the web 11 leaves the transfer site approximately in the opposite direction from its exit path in decorator 10. Whereas in both configurations web 11 passes clockwise around the shuttle roll 29, in label dispenser 50 the web does not pass around shuttle roll 28 but rather, around a new shuttle roll 63 which is also fixed to the shuttle 12. This alternative arrangement does not affect the manner in which the label shuttle assembly and associated cams (discussed above with respect to FIGS. 1 and 2) control the intermittent web and label motion at the labelling site. Since the turret 13 and turret shuttle operation are unchanged as well, the user may use in label dispenser 50 the identical "gearing" (mechanical elements and control electronics) designed to match label pitch to a particular turret and container in heat transfer decorator 10. Applicants have observed that improved film pressure sensitive labelling can be achieved by setting the metering roll 18 at a "gearing" slightly faster than the desired web speed at the labelling site, and using the shuttle assembly to retard web motion—the reverse mode of operation from that normally employed in heat transfer decorators. This is observed to slightly tension the labels during dispensing, therein to improve labelling characteristics.

In heat transfer decorator 10, as noted above, a tension control mechanism associated with take-up reel 21 controls the tension of carrier web 11 downstream of the metering roll 18. In a first embodiment of the film pressure sensitive decorator 50, this function is served by the air motor 68, which provides the torque required to rewind the carrier web on the take-up spindle 67, at a tension which may be controlled by the operator. Air motor 68 provides a reliable, inexpensive take-up device. In the first preferred embodiment of the invention, air motor 68 consisted of a Model 70721 Air Motor of Boston Pneumatics. Although an air motor is the illustrated device for web take-up, an electric motor operating in the stall mode may also be employed.

Referring to FIGS. 4 and 5, the nip roll 58 is placed next to peel blade assembly 60 so as to control the release of a label by the blade. For longer labels, roll 58 anchors the rear end of the label as the forward end is stripped off web 11.

As is well known in the art, a variety of devices may be employed for the pressure sensitive label applicator 65. Various rubber and foam rollers can be used to fix the label to the product, perhaps supplemented by brushes. Other techniques include positive pressure contact with the product or container by pressure pads, pneumatic plungers, spring loaded fingers, knurled rings, powered rotating brushes, etc. A broad range of suitable applicators exist, consistent with the requirement that the applicator device provide positive, uniform pressure to the label against the product to be labelled.

FIG. 5 gives an elevation view of principal devices of the film pressure sensitive label dispenser conversion kit, mounted in the labelling machine 50 of FIG. 3. FIG. 5 is partially sectioned to show bearings and other internal structures. At the left is idler roll 56, mounted above platen cam 24. The next element to the right is applicator roll 65, which is supported by bracket 81 and roll cap 82. Illustratively, applicator roll 65 comprises neoprene rubber of a hardness on the order of 40 durometers. The peel blade 60 is partially cut away to show nip roller 58, which together with peel blade 60 is mounted to support bracket 26. The height of applicator roll 65 and peel plate 60 depends upon the placement and dimensions on the label to be transferred, and these are change parts. Next to the right is shuttle roll 63, shown mounted to label shuttle 22. The remaining structures are supported by mounting plate 61, and include idler roll 66, take-up or rewind reel 67, and air motor 68. Rewind reel 67 and air motor 68 are interconnected by bearing 85 and coupling 86, the latter element supporting a motor mounting plate 88. "T" support 89 provides further structural support for motor 68. Air supply 87 for air motor 68 is seen in FIG. 4.

The above described conversion can be quickly and easily effected. If the user wishes to convert the machine back to use for heat transfer labelling, similarly, the peel plate and label applicator assemblies may be removed, replaced with the heater platen and web guides, and the web then rethreaded as shown in FIG. 1. The remaining structures of apparatus 50 may be retained during heat transfer labelling, as they do not interfere with this mode of operation.

Figure 6:
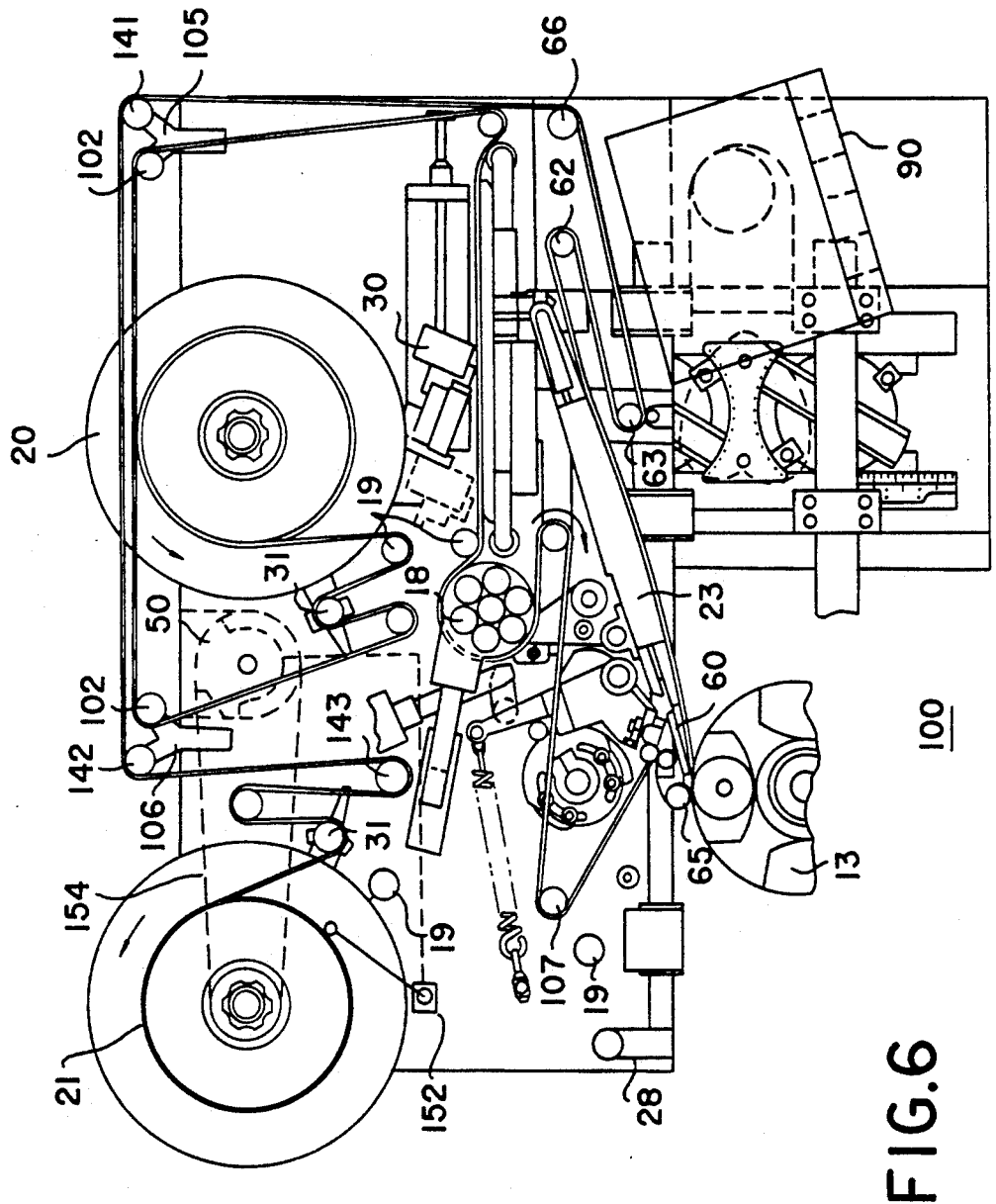
FIG. 6 is a plan view corresponding the view of FIG. 3 of a film pressure sensitive labelling machine in accordance with a second embodiment of the invention.

In the first embodiment of FIGS. 3–5, discussed above, the take-up or rewind reel 21 is no longer operational in collecting the label web and controlling web tension, but is replaced by a substitute take-up device. In the second embodiment 100 of FIGS. 6–9, the take-up reel remains a part of the label web transport, but is modified for the special high web tension requirements of film pressure sensitive labelling. Having reference to FIG. 6, the web path from the unwind reel 20 to metering roll 18 is modified as compared with FIG. 3 by adding extra idler rolls 102 (one of which is mounted to a bracket 105, one to a bracket 106) so that the label carrier web 11 passes around the unwind reel 20 rather than between the unwind reel and photoelectric scanner 30. This alternative web path avoids congestion in the area adjacent the reel 20 and scanner 30. Secondly, the web is no longer routed around an idler roll 56 mounted to the platen cam, but rather around an idler roll 107 beyond the platen cam.

Figure 7:
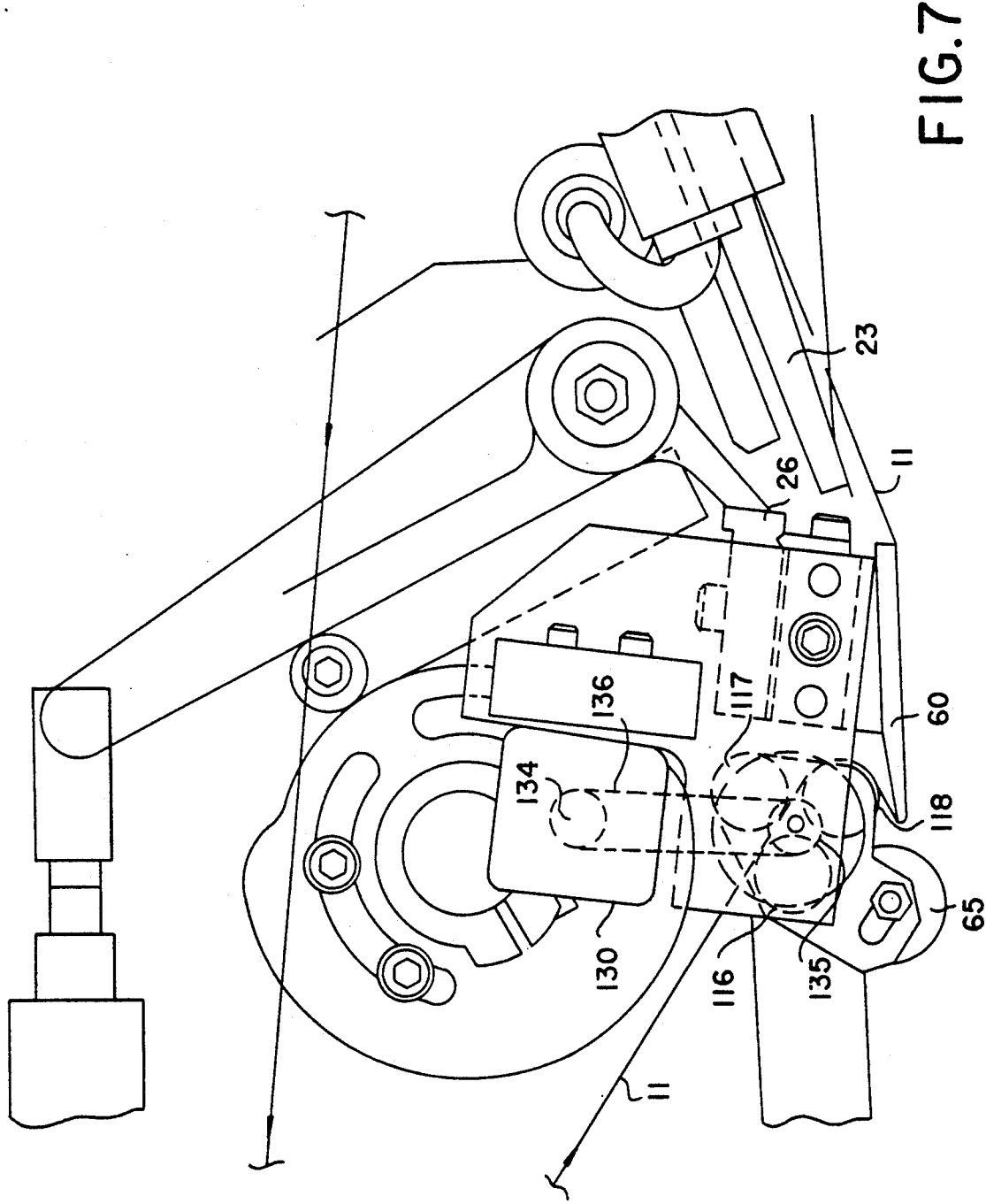
FIG. 7 is a plan view on an expanded scale of the label application area and associated mechanisms of the labelling machine of FIG. 6.
Figure 8:
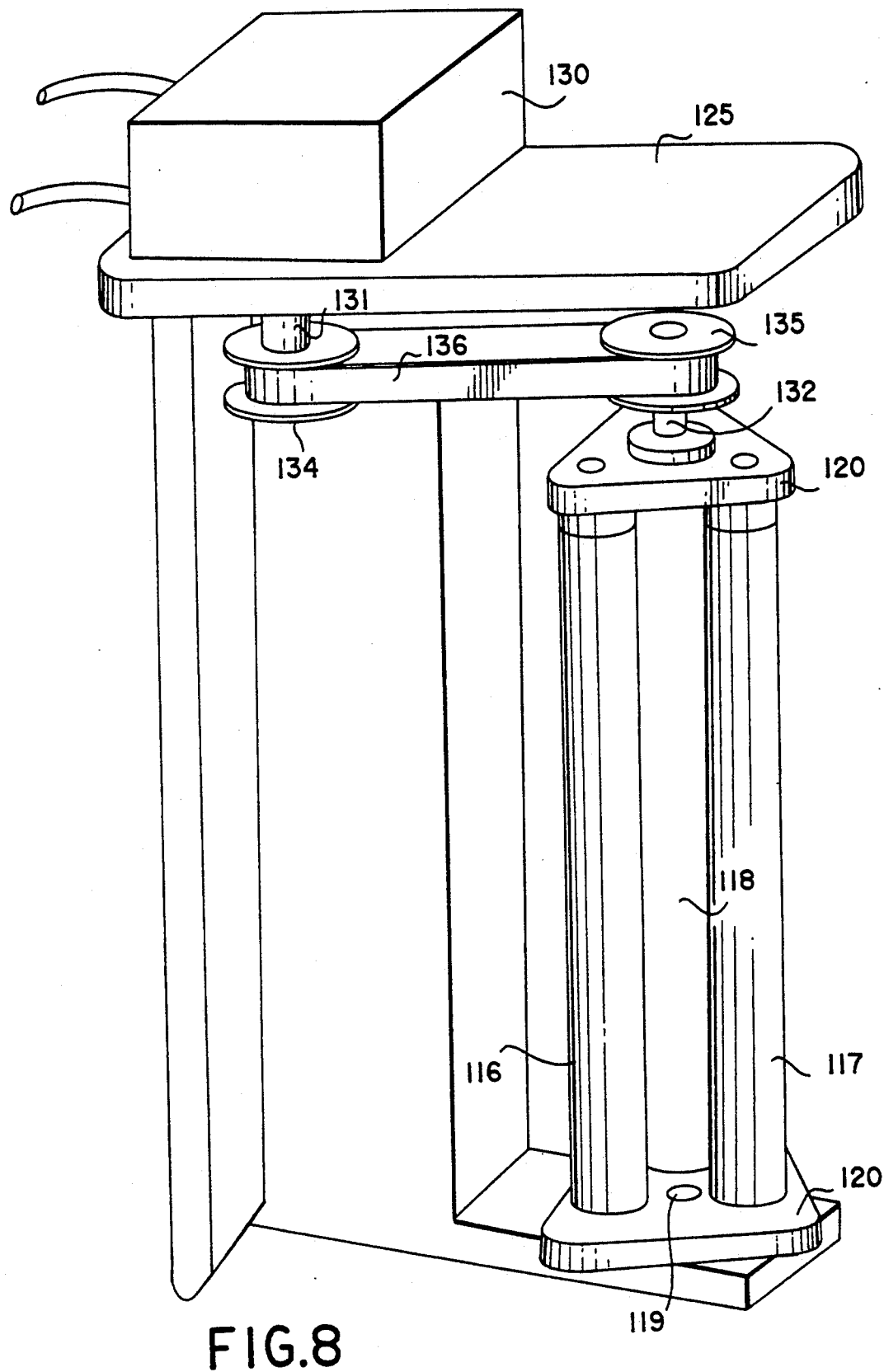
FIG. 8 is a partial perspective view of a web disengaging assembly for the apparatus of FIG. 6.
Figure 9:
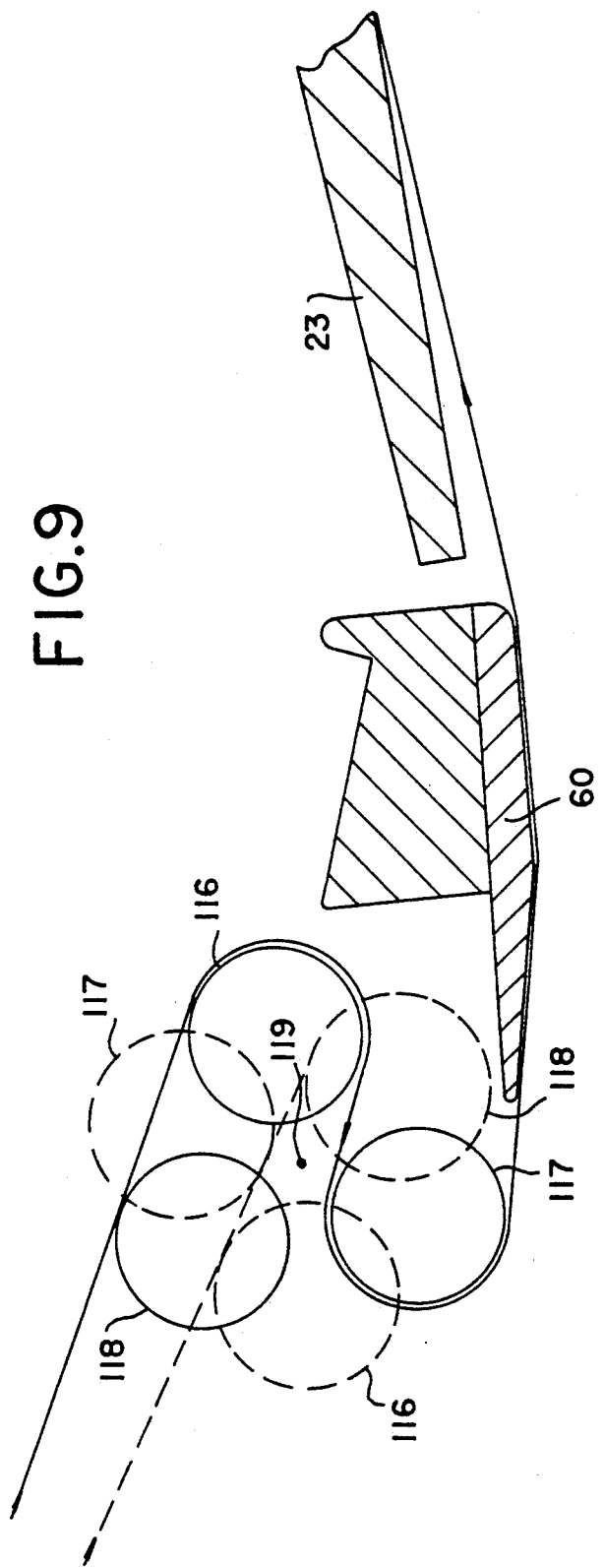
FIG. 9 is a schematic diagram showing the operation of the web disengaging assembly in FIG. 6.

Having references to FIGS. 7–9, a number of changes are made to the mechanisms for routing the web 11 to the peel plate 60 in the labelling machine 100. In lieu of the single nip roll 58 of the apparatus 50 of FIG. 3, the labelling machine 100 incorporates three rolls 116, 117 and 118 around which the web is threaded (FIGS. 7, 9). As best seen in FIG. 8, rolls 116, 117 and 118 are supported by end plates 120, 121 which are pivotally mounted to dispensing platen frame 125. The rolls and end plates can be rotated as an assembly by rotary actuator 130, coupled to these elements by shafts 131, 132, pulleys 134, 135 and belt 136. Thus, as shown in the schematic diagram of FIG. 9, rolls 115, 116 and 118 can be reoriented as a group around a central pivot point 119 between the solid and phantom positions, a 180° rotation. When these rolls are in their solid positions as seen in FIG. 9, the web 11 does not wrap in an acute angle around peel plate 60, and labels will not be stripped off the web during web motion. When these rolls are located in their phantom positions, on the other hand, the path of the web around the roll 118 and peel plate 60 creates an acute web angle at the peel plate edge, causing labels to be stripped during web motion. The phantom roll positions of FIG. 9 are the normal, labelling configuration of rolls 115, 116 and 118, while the rolls are moved to the solid positions during machine set-up. In the latter case, the web may be cycled for set-up purposes without loss of a series of labels at peel plate 60.

A suitable rotary actuator 130 for the assembly of FIG. 7 is a Tol-O-Matic pneumatic vane rotary actuator of Tol-O-Matic, Inc., Minneapolis, Minn. The model 0180-50-2 miniature rotary actuator permits external angle adjustment to a rotation angle of 180° of its output shaft.

As in the embodiment of FIGS. 3–5, the peel blade 60 is removable from the roller assembly to adapt blade length and height to the requirements of a given label and container. Similarly, label applicator 65 may be changed as required.

Referring again to FIG. 6, the web 11, once stripped of labels passes around idler roll 62 and shuttle roll 63 as in the machine 50 of FIG. 3, but thereafter is routed around the perimeter of the machine to the take-up reel 21. Thus, web 11 passes around idler rolls 66, 141, 142, 143 and 144 and dancer roll 31, to take-up reel 21. Applicants have observed that using the prior art tension control system of FIG. 2, the very high tensions characteristic of film pressure sensitive labelling create lead to unduly high wear of the clutch plates 31a due to the grinding of the plates during the stop interval between cycles. Therefore, for more durable performance with improved label registration, the mechanical clutch of FIG. 2 is replaced with a controlled speed rewind motor 50. The angular velocity of rewind motor 50 is dependent upon the diameter of the web roll on take-up reel 21, measured using diameter sensor 152, so that a constant linear velocity of the web 11 is maintained at the take-up reel 21. That is, as the diameter of the rewound roll increases, the torque of motor 150 is increased, and its angular velocity decreased, proportionally. The chain link 79 of the clutch 31a with the metering roll shaft 37 (FIG. 2) is disconnected, and clutch 31a is instead coupled at 154 to rewind motor 150.

Suitable devices for the controlled speed rewind motor include a variable speed electric motor (VARIAC) speed of which may be controlled by a diameter sensor 152 such as a potentiometer, ultrasonic sensor, or an electronic control responsive to the rotation of metering roll 18. Alternatively, the prior art slip clutch 31a may be replaced by a magnetic particle clutch, the speed of which is electronically controlled responsive to the sensed web roll diameter.

Figure 10:
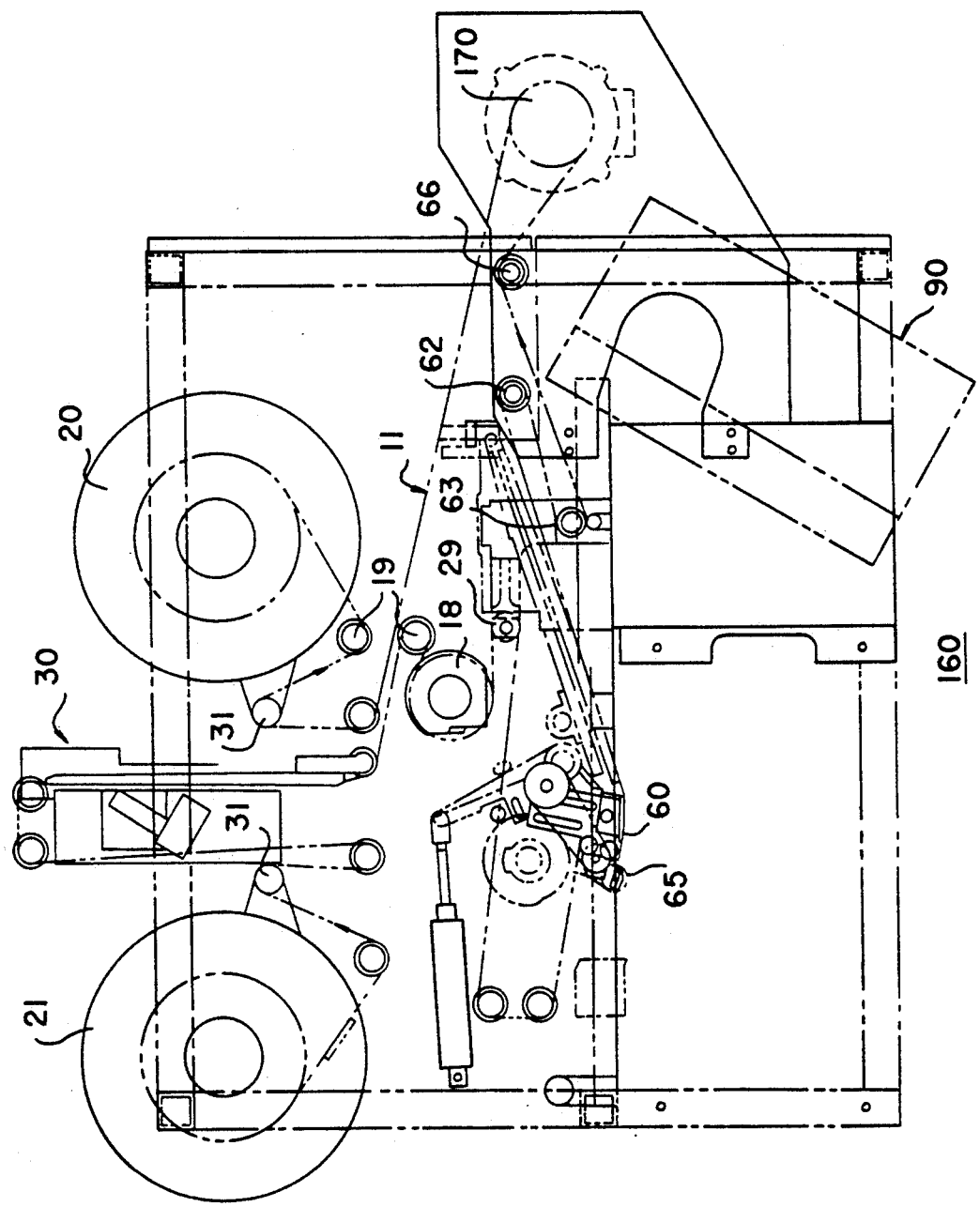
FIG. 10 is a plan view corresponding to the view of FIG. 3 of a film pressure sensitive labelling machine in accordance with a third embodiment of the invention.

The plan view of FIG. 10 shows a third labelling machine embodiment 160 for film pressure sensitive labelling. In labelling machine 160, reel 20 becomes the rewind reel, reel 21 the unwind reel. With reference to FIG. 2, this is accomplished simply by interchanging the clutch and brake at the reels, so that the clutch 31a (with its link to metering roll 18) is placed below reel 20, and the brake (not shown) below reel 21. In machine 160, the photoelectric scanner assembly 30 is relocated as shown between reels 20 and 21. After passing from scanning assembly 30, the web travels over substantially the same path as in the system 100 of FIG. 6, until it reaches label registration drive 170. Label registration drive 170 acts in tandem with the take-up reel 20 to pull the label carrier web 11 through the system. Thus, the torque exerted by drive 170 supplements the torque of take-up reel 20 to provide improved label registration. Applicants have observed that the prior art rewind mechanisms may not in and of themselves provide adequate torque and responsiveness to ensure precise web motion and labelling characteristics during the decoration cycle. By providing a label registration drive 170 downstream of the peel plate 60, the force exerted on the web downstream of the peel plate is increased, and system responsiveness improved. Label registration drive may include a single roll with a good wrap angle, as shown in FIG. 10, or may comprise a pair of nip rollers. In the embodiment of FIG. 10, a urethane roll was mounted to an air motor to provide a high coefficient of friction material for engaging the web. Alternative drive mechanisms for drive 170 include an electric torque motor, and a magnetic particle clutch. The torque exerted by drive 170 can be adjusted depending upon web height, so that the web tension downstream of the peel plate is set at the high level required for labelling, while the tension at the unwind reel 21 is set at the minimum required to maintain web alignment. In the various embodiments discussed above, shuttle rolls were included in the web path both upstream and downstream of the labelling path in order to modulate web motion.

FIG. 11 shows an alternative version 180 of the labelling machine of FIG. 10, wherein only the shuttle roll 29 is employed, and the downstream shuttle roll 63 is no longer used. Shuttle roll 29 may be controlled via the label shuttle cam/slide assembly to slightly retard web motion at peel blade 60, as discussed above.

We claim:

1. For use with a heat transfer labelling machine of the type including a device for moving an article to be labelled through a labelling site, a heated applicator member for impressing a label from a carrier web to the article, and a transport assembly for routing the carrier web bearing a plurality of labels from an unwind reel to the transfer site, and for transporting the empty carrier web from the transfer site to a take-up reel, apparatus for converting said heat transfer labelling machine to use in dispensing pressure sensitive labels arrayed on a carrier web for transfer to an article held in the article moving device, comprising:

a peel plate;

a pressure applicator member, said pressure applicator member and peel plate being designed for mechanical compatibility with said heat transfer labelling machine for use in place of the heated applicator member; and means for disengaging the carrier web from a label dispensing edge of the peel plate, wherein the user may actuate the disengaging means to prevent labels from being dispensed at said label dispensing edge, and deactuate said disengaging means to allow labels to be dispensed at said label dispensing edge.

2. Apparatus as defined in claim 1, wherein the web is threaded around a plurality of rollers immediately upstream of said label dispensing edge, and the disengaging means moves the plurality of rollers from a first position wherein the web is wrapped around the label dispensing edge in an acute angle, and a second position wherein the web is not so wrapped.

3. Apparatus as defined in claim 2, wherein the plurality of rollers are mounted to a support member, and the disengaging means comprises means for rotating the rollers and support member around a pivot axis parallel to the longitudinal axis of the rollers.

4. Apparatus as defined in claim 2 wherein there are three rollers.

5. Apparatus as defined in claim 3 wherein there are three of said rollers spaced around said pivot axis.

6. Apparatus as defined in claim 1, wherein the transport assembly includes a movable nip roll, and wherein when said disengaging means is deactivated, the nip roll is placed immediately upstream of the peel plate edge to control the release of labels at said peel plate.

* * * * *